US012297405B2

(12) United States Patent
Goodrich et al.

(10) Patent No.: US 12,297,405 B2
(45) Date of Patent: *May 13, 2025

(54) CHLOROPROPANOL REMOVAL PROCESS

(71) Applicant: GREEN LIZARD TECHNOLOGIES, LTD., Belfast (GB)

(72) Inventors: Peter Goodrich, Belfast (GB); Eoghain O'Hara, Belfast (GB); Martin Atkins, Belfast (GB)

(73) Assignee: Green Lizard Technologies, Ltd., Belfast (GB)

( * ) Notice: Subject to any disclaimer, the term of this patent is extended or adjusted under 35 U.S.C. 154(b) by 658 days.

This patent is subject to a terminal disclaimer.

(21) Appl. No.: 17/289,823

(22) PCT Filed: Oct. 29, 2019

(86) PCT No.: PCT/GB2019/053053

§ 371 (c)(1),
(2) Date: Apr. 29, 2021

(87) PCT Pub. No.: WO2020/089605

PCT Pub. Date: May 7, 2020

(65) Prior Publication Data

US 2021/0395637 A1 Dec. 23, 2021

(30) Foreign Application Priority Data

Oct. 29, 2018 (GB) .................................... 1817662

(51) Int. Cl.
*C11B 3/06* (2006.01)

(52) U.S. Cl.
CPC .................................... *C11B 3/06* (2013.01)

(58) Field of Classification Search
CPC .................................... C11B 3/06; C11B 3/12
See application file for complete search history.

(56) References Cited

U.S. PATENT DOCUMENTS

| | | | |
|---|---|---|---|
| 1,885,859 | A | 11/1932 | Rosenstein et al. |
| 6,579,996 | B2 | 6/2003 | Peter et al. |

FOREIGN PATENT DOCUMENTS

| | | | | |
|---|---|---|---|---|
| GB | 391658 A | | 5/1933 | |
| GB | 2538758 A | | 11/2016 | |
| WO | 2012/169718 A1 | | 12/2012 | |
| WO | WO2012/169718 | * | 12/2012 | ............... A23D 9/02 |

OTHER PUBLICATIONS

Sigfried, P., et al., Deacidification of oils and fats of biological origin by aqueous solutions of tertiary amines, Oleagineux, Corps Gras, Lipids, vol. 8, No. 1, pp. 53-56 (9 pages), (Year: 2001).*

Zufarov, O., et al., Ethanolamines used for degumming of rapeseed and sunflower oils as diesel fuels, European Journal of Lipid Science and Technology, vol. 111(10), pp. 985-992 (Year: 2009).*

Siegfried, et al., "Deacidification of Oils and Fats of Biological Origine by Aqueous Solutions of Tertiary Amines," Oléagineux, Corps Gras, Lipides. Vol. 8, No. 1, 2001, all enclosed pages cited.

Zufarov, et al., "Ethanolamines used for degumming of rapeseed and sunflower oils as diesel fuels," European Journal of Lipid Science and Technology, vol. 111 (10), 2009, all enclosed pages cited.

* cited by examiner

*Primary Examiner* — Yate' K Cutliff
(74) *Attorney, Agent, or Firm* — Hodgson Russ LLP

(57) ABSTRACT

The invention relates to processes for the refining of oils. In particular, the invention relates to processes for the refining of oils of biological origin such as vegetable oils.

20 Claims, No Drawings

CHLOROPROPANOL REMOVAL PROCESS

CROSS-REFERENCE TO RELATED APPLICATIONS

This application is a national phase entry of International Application number PCT/GB2019/053053 filed Oct. 29, 2019, which claims the benefit of British application number 1817662.8 filed Oct. 29, 2018, all of which are incorporated by reference in their entirety

FIELD OF THE INVENTION

The invention relates to processes for the refining of oils. In particular, the invention relates to processes for the refining of oils of biological origin such as vegetable oils.

BACKGROUND OF THE INVENTION

There are a plethora of glyceride oils that may be extracted from natural sources for human or animal consumption, or for other domestic and commercial uses, including use in bio-diesel. Such glyceride oils include, for example, vegetable oils, marine oils and animal fats and oils. Typically, it is necessary for glyceride oils to undergo refining before their use which can vary depending on the particular oil and the associated level and nature of any contamination following extraction and also depending, for instance, on the desired organoleptic properties of the refined oil.

Glyceride oils, particularly vegetable oils, have numerous applications and are typically associated with use in bio-diesel applications, food preparation and food additives, and even as additive in cosmetics and cleaning products. For example, palm oil, soybean oil, rapeseed oil (canola oil) and corn oil are known to have both food and non-food applications.

In order to be rendered edible crude glyceride oils must undergo a refining process to remove unwanted components. Crude palm oil comprises mono-, di- and tri-glycerides, carotenes, sterols, as well as free fatty acids (FFA), which are not esterified with glycerol to any extent. FFA leads to degradation of the oil and an increase in rancidity and is thus one of a number of components that the refining process seeks to remove. Other possible contaminants of glyceride oils, the removal of which has become critically important, are chloropropanol and/or glycidol, or their fatty acid esters.

Unbound chloropropanol, particularly 3-MCPD, has been identified in numerous soy based products including, for example, soy sauce, as well as acid-hydrolysed vegetable protein. Meanwhile, chloropropanols and glycidol in the form of their fatty acid esters have been found to accumulate in glyceride oil, particularly refined oil which has been exposed to high temperatures, for example as a result of the refining process. Upon consumption, fatty acid esters of chloropropanols and glycidol are hydrolysed by lipases in the gastrointestinal tract, releasing free chloropropanols and glycidol. Chloropropanols typically exist in the form of monochloropropandiols, 2-chloro-1,3-propanediol (2-MCPD) and 3-chloro-1,2-propanediol (3-MCPD), or the corresponding dichloropropanols derived therefrom, 2,3-dichloropropan-1-ol (2,3-DCP) and 1,3-dichloropropan-2-ol (1,3-DCP) respectively.

The most common chloropropanol associated with the consumption of refined edible glyceride oils is 3-MCPD, which has been found to exhibit genotoxic carcinogenic effects in in vitro testing. As a result, the Joint FAO/WHO Expert Committee on Food Additives (JECFA) established a provisional maximum tolerable daily intake (TDI) of 2 µg/Kg body weight for 3-MCPD in 2001, which was retained on review of new studies in 2006. Investigations into the potential carcinogenic effects of the other free chloropropanols have also been undertaken (Food Chem Toxicol, 2013, August; 58: pages 467 to 478).

Fatty acid esters of chloropropanols are thought to be produced from a mono- or di-glyceride via the formation of a cyclic acyloxonium ion followed by ring opening with a chloride ion (Destaillats, F.; Craft, B. D.; Sandoz, L.; Nagy, K.; Food Addit. Contam. 2012b, 29, 29-37), as illustrated below where $R_1$=H (monoglyceride) or C(O)R (diglyceride); 1=2-MCPD ester; and 2=3-MCPD ester).

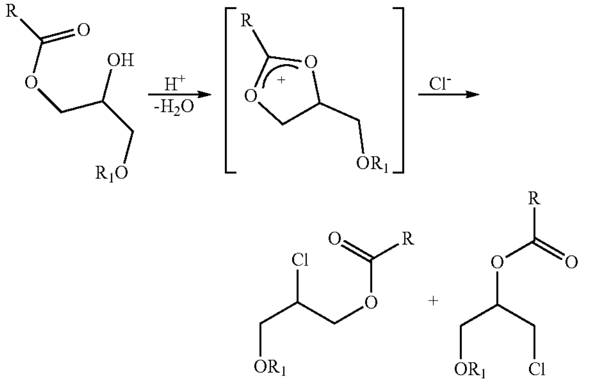

1 2

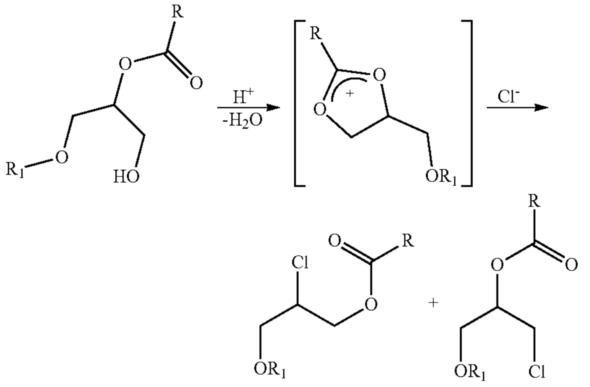

1 2

The International Life Sciences Institute (ILSI) Europe Report Series entitled "3-MCPD Esters in Food Products" by John Christian Larsen (October 2009) provides an overview of recent opinion with respect to 3-MCPD esters and their contamination in native, unrefined fats and oils, as well as refined fats and oils. Reported therein is an investigation conducted by Chemisches and Veterinäruntersuchungsamt (CVUA, Stuttgart, Germany), which indicated that traces of 3-MCPD esters can be found in some native, unrefined fats and oils. Meanwhile, significant amounts of 3-MCPD esters were found in nearly all refined fats and oils.

Deodorisation was identified as the crucial step in the refining process leading to formation of 3-MCPD esters. However, it was also found that there is some formation as a result of bleaching, for instance with bleaching earth. Furthermore, an acidic pre-treatment of crude oil, for instance with hydrochloric or phosphoric acids as part of degumming was also found to exacerbate 3-MCPD ester formation. The survey classified the refined vegetable oils and fats which were tested as part of the survey according to the level of 3-MCPD found to be ester-bound therein, shown below:

Low level (0.5-1.5 mg/kg): rapeseed, soybean, coconut, sunflower oil

Medium level (1.5-4 mg/kg): safflower, groundnut, corn, olive, cottonseed, rice bran oil High level (>4 mg/kg): hydrogenated fats, palm oil and palm oil fractions, solid frying fats.

It is also reported that fatty acid esters of glycidol have also been detected in refined glyceride oils. Glycidyl ester (GE) is another known contaminant which has been classified by the International Agency for Research on Cancer (1ARC) as "probably carcinogenic to humans" (1ARC Group 2A) and their formation, for instance during heat treatment of vegetable fat, has raised additional safety concerns (IARC, 2000). Glycidyl fatty acid esters are thought to derive from the same acyloxonium intermediate from which fatty acid esters of 3-MCPD and 2-MCPD are formed. Rather than nucleophilic attack of the acyloxonium with a chloride ion, the glycidyl ester is formed as a result of deprotonation and epoxide formation of an acyloxonium intermediate derived from a monoglyceride, as illustrated below.

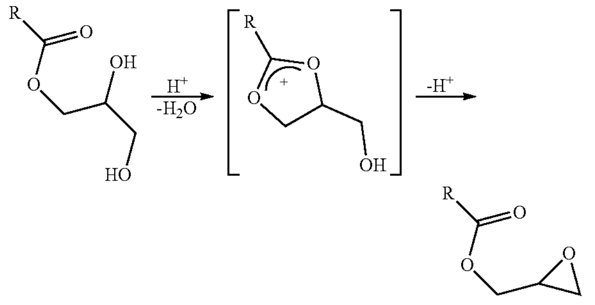

This is supported by the above ILSI report which states that, in the absence of sufficient amounts of chloride ions in the crude oil, the reaction ends with glycidyl fatty acid ester formation. In contrast, under the conditions of analysis conducted in the above CVUA investigation, involving addition of sodium chloride, it is reported that glycidol nearly quantitatively reacts to form 3-MCPD. There are strong indications that a significant amount (10 to 60%) of measured bound 3-MCPD does in fact derive from fatty acid esters of glycidol formed as a result of the analysis itself.

Glycidyl fatty acid ester is, however, believed to derive predominantly from diglycideride as a result of a heat promoted intramolecular elimination reaction, as illustrated below (Destaillats, F.; Craft, B. D.; Dubois, M.; Nagy, Food Chem. 2012a, 131, 1391-1398).

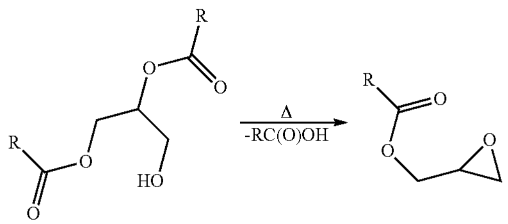

Water used as a strip stream for deodorisation was initially suspected of providing a source of chloride, thereby exacerbating the formation of chloropropanol fatty acid esters and glycidyl fatty acid esters. However, this was shown not to be the case (Prudel et al., Eur, J. Lipid Sci. Technol. 2011, 113, 368-373) and it has instead been suggested that the chlorine donor must instead be present in the oil in an oil-soluble form to enable the formation of chloropropanols (Matthaus et al., Eur, J. Lipid Sci. Technol. 2011, 113, 380-386).

Inorganic sources of chloride typically found in glyceride oils include iron [III] chloride (a coagulant in water treatment), KCl or ammonium chloride (used to improve plant growth), and calcium and magnesium chlorides. Meanwhile, organochlorine compounds present in crude glyceride oils can be converted to reactive chlorinated compounds such as hydrogen chloride, for instance as a result of thermal decomposition, which can react with acyl glycerols as illustrated above. The organochlorines may be endogenously produced by plants during maturation (Matthäus, B., Eur. J. Lipid Sci. Technol. 2012, 59, 1333-1334; Nagy, K.; Sandoz, L.; Craft, B. D.; Destaillats, F.; Food Addit. Contam. 2011, 28, 1492-1500; and "Processing Contaminants in Edible Oils-MCPD and Glycidyl Esters", AOCS Press, 2014, Chapter 1).

As mentioned above, the prevalence of fatty acid esters of chloropropanols and glycidol in glyceride oils increases substantially upon exposure to elevated temperatures and other process conditions associated with refining. Typically, phospholipid-containing glyceride oils such as crude palm oil undergo degumming with aqueous phosphoric acid and/or aqueous citric acid to remove hydratable and non-hydratable lipid components and other unwanted substances before FFA are removed. FFA are removed to improve organoleptic properties and oil stability. Deacidification in conventional processing is either by a chemical route (neutralisation) through the addition of a strong base such as sodium hydroxide ("chemical refining") or by means of a physical route such as steam stripping ("physical refining"). Edible oil refining also typically includes bleaching (e.g. with bleaching earth or clay) and deodorisation (which may also be used to remove FFA) before the refined glyceride oil is considered fit for commercial use. Several methods have now been proposed in the prior art for the removal of fatty acid esters of chloropropanols and glycidol, or their precursors, from edible glyceride oils as part of the overall refining process.

WO 2011/009843 describes a process for removing ester bound MCPD by stripping vegetable oil or fat with an inert gas, such as nitrogen, during deodorisation instead of steam stripping. The process is performed at temperatures of above 140° C. and below 270° C. and therefore offers no significant energy savings over conventional glyceride oil refining processes.

Eur, J. Lipid Sci. Technol. 2011, 113, 387-392 discloses a method of removal of 3-MCPD fatty acid esters and glycidyl fatty acid esters from palm oil using a calcined zeolite and synthetic magnesium silicate adsorbent. WO 2011/069028 also discloses a process for removing glycidyl fatty acid esters from vegetable oil by contacting with an adsorbent, such as magnesium silicate, silica gel and bleaching clay, before steam refining and deodorizing the oil. Issues with the use of adsorbents include the potential for neutral oil losses and the lack of adsorbent recycle options which can have a significant impact on the economic viability of preparing refined glyceride oil.

It is also known, for instance from U.S. Pat. No. 2,771,480, that ion exchange resins can be used for removing FFA, colour-bodies, gums and flavour materials from glyceride oils by adsorption of these impurities onto ion-exchange resins. WO 2011/009841 describes the use of an ion exchange resin, such as carboxymethyl cellulose, for selectively binding species involved in the formation of MCPD esters, or the esters themselves, during the deodorisation process.

As an alternative, WO 2012/130747 describes a process for removing chlorinated contaminants from crude plant oil by means of a liquid-liquid extraction with a polar solvent solution, for example an acidified ethanol-water solution, which is non-miscible with the plant oil. The polar solvent phase is discarded following the extraction before the oil undergoes further refinement.

Liquid-liquid extraction techniques with polar solvents have previously been disclosed as oil treatments for glyceride oils, for instance for the removal of FFA, operating on the basis of the solubility differences of the contaminant and the oil effecting separation by selective partitioning into a particular solvent phase. Meirelles et al., Recent Patents on Engineering 2007, 1, 95-102, gives an overview of such approaches to the deacidification of vegetable oils. Liquid-liquid extraction methods are generally considered to be advantageous on the basis that they may be performed at room temperature, they do not generate waste products and they benefit from low neutral oil losses. However, Meirelles et al. observe that there are significant capital costs associated with the implementation of a liquid-liquid extraction process and there remain doubts as to the overall benefits. Moreover, the polar solvents used in these liquid-liquid extraction techniques are often capable of also removing mono- and di-glycerides from the oil in addition to FFA, which may not be desirable.

It would be beneficial if there was an alternative glyceride oil treatment which was capable of removing chloropropanol, chloropropanol fatty acid esters, glycidol and glycidol fatty acid esters and which could be readily integrated into a conventional glyceride oil refining process. The inventors of the present invention have further appreciated that it would be beneficial if chloropropanol, chloropropanol fatty acid esters, glycidol and glycidol fatty acid esters could be removed from glyceride oils in the same treatment as the removal of other impurities, such as free fatty acids (FFA).

A method of free fatty acid removal from vegetable oils known in the art is extraction of the free fatty acids using aqueous organic amines. An aqueous solution of an organic amine such as dimethylethanolamine is added to a vegetable oil. In this process the free fatty acids move from the triglyceride phase of the vegetable oil into the aqueous organic amine containing phase which may then be separated from the vegetable oil.

U.S. Pat. No. 6,579,996 discloses a process for removing free fatty acids from fats or oils of biological origin by extracting the free fatty acids with a mixture of basic organic nitrogen compounds and water as an extraction medium.

U.S. Pat. No. 1,885,859 discloses a process of purifying oils, fats and waxes of the ester type by contacting the material to be treated with an alkylolamine.

U.S. Pat. No. 2,164,012 discloses a process of refining fatty materials with a nitrogen-containing amine extractant, which process includes washing the raffinate obtained by the main extraction with water to remove free extractant, before washing the raffinate with dilute aqueous acid so as to remove soaps from the fatty materials.

SUMMARY OF THE INVENTION

The present invention is based on the surprising finding that organic amines can remove other impurities from glyceride oils such as vegetable oils in addition to free fatty acids. Surprisingly, it has been found that chloropropanol, chloropropanol fatty acid esters, glycidol and glycidol fatty acid esters present in glyceride oils such as vegetable oils may be removed by contacting the glyceride oil with an organic amine.

According to an aspect of the invention, there is provided the use of an organic amine for removing chloropropanol or glycidol, or their fatty acid esters, from a glyceride oil comprising chloropropanol or glycidol, or their fatty acid esters by contacting the oil with the organic amine, wherein the organic amine is selected from:

$$N(R^a)(R^b)(R^c),$$

wherein: $R^a$, $R^b$, and $R^c$ are each independently selected from a $C_1$ to $C_8$, straight chain or branched alkyl group or a $C_3$ to $C_6$ cycloalkyl group; or any two of $R^a$, $R^b$ and $R^c$ combine to form an alkylene chain $—(CH_2)_q—$ wherein q is from 3 to 6; and wherein said alkyl or cycloalkyl groups may optionally be substituted by one to three groups selected from: $C_1$ to $C_4$ alkoxy, $C_2$ to $C_8$ alkoxyalkoxy, $C_3$ to $C_6$ cycloalkyl, —OH, $—NH_2$, —SH, $—CO_2(C_1$ to $C_6)$alkyl, and $—OC(O)(C_1$ to $C_6)$alkyl; or $R^a$ is hydrogen and $R^b$, and $R^c$ are as previously defined.

According to another aspect of the invention, there is provided a process for removing chloropropanol and/or glycidol, or their fatty acid esters, from glyceride oil, wherein the total concentration of chloropropanol and fatty acid esters thereof in the glyceride oil is at least 0.01 ppm, and wherein the total concentration of glycidyl fatty acid esters in the glyceride oil is at least 0.1 ppm, the process comprising the steps of:

(i) contacting glyceride oil comprising chloropropanol and/or glycidol, or their fatty acid esters, with an organic amine and water to form a treated glyceride oil and an aqueous phase; wherein the water is added in an amount from 5% v/v to 40% v/v relative to the organic amine and the amount of organic amine is from 1 wt. % to 75 wt. % relative to the glyceride oil; and the organic amine is selected from:

$$N(R^a)(R^b)(R^c),$$

wherein: $R^a$, $R^b$, and $R^c$ are each independently selected from a $C_1$ to $C_8$, straight chain or branched alkyl group or a $C_3$ to $C_6$ cycloalkyl group; or any two of $R^a$, $R^b$ and $R^c$ combine to form an alkylene chain $—(CH_2)_q—$ wherein q is from 3 to 6; and wherein said alkyl or cycloalkyl groups may optionally be substituted by one to three groups selected from: $C_1$ to $C_4$ alkoxy, $C_2$ to $C_8$ alkoxyalkoxy, $C_3$ to $C_6$ cycloalkyl, —OH, $—NH_2$, —SH, $—CO_2(C_1$ to $C_6)$alkyl, and $—OC(O)(C_1$ to $C_6)$alkyl; or $R^a$ is hydrogen and $R^b$, and $R^c$ are as previously defined; and (ii) separating the treated glyceride oil from the aqueous phase after contacting the glyceride oil with the organic amine and water; wherein the treated glyceride oil has a reduced concentration of chloropropanol and/or glycidol, or their fatty acid esters, compared to the glyceride oil contacted in step (i).

DETAILED DESCRIPTION OF THE INVENTION

According to a first aspect of the invention, there is provided the use of an organic amine for removing chloropropanol or glycidol, or their fatty acid esters, from a glyceride oil comprising chloropropanol or glycidol, or their fatty acid esters by contacting the oil with the organic amine, wherein the organic amine is selected from:

$N(R^a)(R^b)(R^c)$, wherein: $R^a$, $R^b$, and $R^c$ are each independently selected from a C to $C_8$, straight chain or branched alkyl group or a $C_3$ to $C_6$ cycloalkyl group; or any two of $R^a$, $R^b$ and $R^c$ combine to form an alkylene chain $-(CH_2)_q-$ wherein q is from 3 to 6; and wherein said alkyl or cycloalkyl groups may optionally be substituted by one to three groups selected from: $C_1$ to $C_4$ alkoxy, $C_2$ to $C_8$ alkoxyalkoxy, $C_3$ to $C_6$ cycloalkyl, —OH, $-NH_2$, —SH, $-CO_2(C_1$ to $C_6)$alkyl, and $-OC(O)(C_1$ to $C_6)$alkyl; or $R^a$ is hydrogen and $R^b$, and $R^c$ are as previously defined.

The treatment of glyceride oil by contacting with an organic amine so as to reduce the concentration of chloropropanol, glycidol, or their fatty acid esters, may be suitably applied to crude glyceride oil comprising chloropropanol, glycidol, or their fatty acid esters, which has not undergone any previous refining steps. Alternatively, the above process may be applied to glyceride oil comprising chloropropanol, glycidol, or their fatty acid esters, which has undergone one or more additional refining steps prior to treatment with the organic amine.

The treatment with organic amine can therefore be integrated into a glyceride oil refining process at several stages. For instance, the treatment can be implemented at a stage at the beginning of the refining process. Alternatively, the treatment can be implemented towards the end of the refining process. This flexibility makes the treatment with organic amine in accordance with the present invention particularly attractive for integrating into pre-existing refining processes and systems.

The term "crude" used herein in reference to glyceride oil is intended to mean glyceride oil which has not undergone refining steps following oil extraction. For example, crude glyceride oil will not have undergone degumming, deacidification, winterisation, bleaching, depigmentation or deodorization. "Refined" used herein in reference to glyceride oil is intended to mean a glyceride oil which has undergone one or more refining steps, such as degumming, deacidification, winterisation, bleaching, depigmentation and/or deodorization.

Use according to the invention comprises contacting a glyceride oil comprising chloropropanol, glycidol, or their fatty acid esters, with an organic amine so as to reduce the concentration of chloropropanol, glycidol, or their fatty acid esters in the glyceride oil. The organic amine may be added to the glyceride oil in any suitable amount sufficient to remove chloropropanol, glycidol, or their fatty acid esters, from the glyceride oil. Typically, the organic amine is added to the glyceride oil in an amount of from 1 wt. % to 80 wt. % relative to the amount of glyceride oil. Preferably, the organic amine is added in an amount of from 1 wt. % to 40 wt. % relative to the amount of glyceride oil, more preferably, from 1 wt. % to 20 wt. %, and most preferably from 2 wt. % to 8 wt. %. For example, the organic amine can be added in an amount of from 4 wt. % to 6 wt. % relative to the amount of glyceride oil, such as 5 wt. %.

Use according to the invention preferably comprises adding water to the glyceride oil as well as the organic amine. The water may be any sort of water. For example, water of varying degrees of purity may be used. More pure forms of water such as distilled water may be used, but water with various impurities present such as salts dissolved therein may also be used. The water may be present in any suitable amount sufficient for removing chloropropanol, glycidol, or their fatty acid esters from the glyceride oil. For example, the water may be present in an amount of from 1% v/v to 80% v/v relative to the organic amine. Typically, the water is present in an amount of from 15% v/v to 40% v/v relative to the organic amine.

Preferably, the water is present in an amount of from 25% v/v to 35% v/v, such as 30% v/v relative to the organic amine.

Alternatively, a different solvent or a mixture of solvents may be used providing the solvent(s) are compatible with the glyceride oil and organic amine. Polar solvents are preferred alternative solvents. For example, an alcohol or a mixture of water and alcohol may be used.

The organic amine used is typically a compound having the following formula:

$N(R^a)(R^b)(R^c)$, wherein: $R^a$, $R^b$, and $R^c$ are each independently selected from a $C_1$ to $C_8$, straight chain or branched alkyl group wherein said alkyl group may be unsubstituted or may be substituted by one to three groups selected from: $C_1$ to $C_4$ alkoxy, $C_2$ to $C_8$ alkoxyalkoxy, $C_3$ to $C_6$ cycloalkyl, —OH, $-NH_2$, —SH, $-CO_2(C_1$ to $C_6)$alkyl, and $-OC(O)(C_1$ to $C_6)$alkyl, for example one to three —OH or $-NH_2$ groups; or $R^a$ is hydrogen and $R^b$, and $R^c$ are as previously defined.

Preferably, the organic amine is a compound of the following formula:

$N(R^a)(R^b)(R^c)$, wherein: $R^a$, $R^b$, and $R^c$ are each independently selected from a $C_1$ to $C_4$, straight chain or branched alkyl group wherein at least one of $R^a$, $R^b$, and $R^c$ is substituted by a single —OH group.

More preferably, the organic amine is a tertiary amine comprising 3 alkyl chains bonded to a nitrogen atom, wherein one of the alkyl chains is substituted with an OH group.

Most preferably, the organic amine is the compound dimethylethanolamine which has the formula:

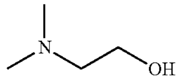

Dimethylethanolamine is highly preferred since its use as an additive in or as a reagent in the processing of food products is approved in many countries. This is particularly advantageous in applications where it is intended to use the glyceride oil in food products, or as a cooking oil.

The organic amine can be used to reduce the concentration of glycidol, chloropropanol, and their fatty acid esters thereof in the glyceride oil.

"Chloropropanol" referred to herein corresponds to chloropropanols which may, for instance, derive from glycerol and which include monochloropropanol: 2-chloro-1,3-propanediol (2-MCPD) and 3-chloro-1,2-propanediol (3-MCPD), as well as dichloropropanol: 2,3-dichloropropan-1-ol (2,3-DCP) and 1,3-dichloropropan-2-ol (1,3-DCP). Fatty acid esters of chloropropanols referred to herein correspond to the mono- or di-ester form of the chloropropanols formed from esterification with FFA.

Glycidol referred to herein corresponds to 2, 3-epoxy-1-propanol. Fatty acid esters of glycidol referred to herein correspond to the ester form of glycidol formed from esterification of glycidol with FFA.

Preferably, the chloropropanol comprises monochloropropanol. In instances, the chloropropanol comprises 2-chloro-1,3-propanediol (2-MCPD), 3-chloro-1,2-propanediol (3-MCPD), or a combination thereof. More preferably, the chloropropanol comprises 3-chloro-1,2-propanediol (3-MCPD).

It has been found that the organic amine used in accordance with the present invention is capable of removing chloropropanol and glycidol, and their fatty acid esters, from glyceride oil. Several reaction mechanisms are believed to be possible as a result of contacting the oil with the organic amine. Without being bound by any particular theory, the organic amine may promote preferential partitioning of chloropropanol and glycidol, and their fatty acid esters, into an organic amine containing phase. Alternatively, the organic amine may promote hydrolysis of chloropropanol and/or glycidol, or their fatty acid esters, in the presence of water. For example, base promoted hydrolysis may lead to cleavage of the chlorine-carbon bond of chloropropanol and fatty acid esters thereof whilst base promoted hydrolysis may lead to ring opening of the epoxide of glycidol and fatty acid esters thereof.

Unbound chloropropanol and glycidol may be present in glyceride oils to various extents. For instance, unbound chloropropanol corresponds to one of numerous organochlorine compounds which may be endogenously produced by plants during maturation (Matthäus, B., Eur. J. Lipid Sci. Technol. 2012, 59, 1333-1334; Nagy, K.; Sandoz, L.; Craft, B. D.; Destaillats, F.; Food Addit. Contam. 2011, 28, 1492-1500; and "Processing Contaminants in Edible Oils-MCPD and Glycidyl Esters", AOCS Press, 2014, Chapter 1). Meanwhile, formation of chloropropanol fatty acid esters and glycidyl fatty acid esters has been found to depend predominantly on: (i) the mono- and di-glyceride content of glyceride oil; (ii) the chloride content of glyceride oil; (iii) the proton activity of glyceride oil; and (iv) the extent of heat exposure during refining.

In some instances, the total concentration of monochloropropanol and fatty acid esters thereof in the glyceride oil is at least 0.01 ppm, for example at least 0.1 ppm, at least 0.5 ppm or at least 1.0 ppm. In exemplary instances, the total concentration of monochloropropanol and fatty acid esters thereof, in the glyceride oil contacted may be from 0.01 ppm to 30 ppm, from 1 ppm to 25 ppm, or from 1.5 ppm to 20 ppm.

In the above instances, the method by which the total concentration of monochloropropanol and fatty acid esters thereof is suitably determined is by DGF standard method C-VI 18 (10) A or B. These are indirect methods for determining the total concentration of monochloropropanol and fatty acid esters thereof, where fatty acid esters of monochloropropanol are converted to non-bound monochloropropanol by methanolysis under alkali conditions and followed by GC-MS analysis. In either method A or B, the methodology negates any impact of the presence of fatty acid esters of glycidol in the sample either by a removal step (method A) or by using NaBr rather than NaCl as part of the method (method B) to prevent conversion of fatty acid esters of glycidol to fatty acid esters of monochloropropanol.

In some instances, the total concentration of glycidyl fatty acid esters in the glyceride oil contacted is at least 0.1 ppm, for example at least 1.0 ppm, at least 2.0 ppm or at least 5 ppm. In exemplary instances, the total concentration of glycidyl fatty acid esters thereof, in the glyceride oil contacted may be from 0.1 ppm to 30 ppm, from 1 ppm to 25 ppm, or from 1.5 ppm to 20 ppm.

In the above instances, the method by which the total concentration of glycidyl fatty acid esters is suitably determined by a combination of DGF standard method C-VI 17 (10) and DGF standard method C-VI 18 (10) A or B. DGF standard method C-VI 17 (10) is used to determine the total concentration of monochloropropanol and glycidol and their fatty acid esters whilst DGF standard method C-VI 18 (10) A or B determines the concentration of monochloropropanol and their fatty acid esters alone, as discussed above. Employing both methods allows for the concentration of glycidyl fatty acid esters to be determined indirectly by subtracting the determined concentration of monochloropropanol and their fatty acid esters from the determined sum of monochloropropanol and fatty acid esters thereof together with glycidyl esters.

In some instances, the total concentration of monochloropropanol and fatty acid esters thereof in the glyceride oil which is contacted with the organic amine is at least 0.01 ppm, for example at least 0.1 ppm, at least 0.5 ppm or at least 1.0 ppm, as determined by DGF standard method C-VI 18 (10) A or B. In exemplary instances, the total concentration of monochloropropanol and fatty acid esters thereof, in the glyceride oil which is contacted with the organic amine may be from 0.01 ppm to 30 ppm, from 1 ppm to 25 ppm, or from 1.5 ppm to 20 ppm.

In some instances, the total concentration of glycidyl fatty acid esters in the glyceride oil with the organic amine is at least 0.1 ppm, for example at least 1.0 ppm, at least 2.0 ppm or at least 5 ppm, as determined by a combination of DGF standard method C-VI 17 (10) and DGF standard method C-VI 18 (10) A or B. In exemplary instances, the total concentration of glycidyl fatty acid esters in the glyceride oil which is contacted with the organic amine may be from 0.1 ppm to 30 ppm, from 1 ppm to 25 ppm, or from 1.5 ppm to 20 ppm.

In other instances, the total concentration of chloropropanol and fatty acid esters thereof in the glyceride oil is from 20 ppm to 250 ppm, as determined by DGF standard method C-VI 18 (10) A or B.

Use according to the invention comprises contacting a glyceride oil comprising chloropropanol and/or glycidol, or their fatty acid esters with an organic amine and preferably water. The contacting is carried out at a temperature lower than the boiling point of the organic amine. The contacting is typically carried out at a temperature of less than 130° C., or less than 80° C., preferably from 25° C. to 70° C., more preferably from 35° C. to 65° C., most preferably from 45° C. to 55° C., for example 50° C. As will be appreciated, where the glyceride oil is semi-solid at room temperature, higher temperatures are preferable such that the glyceride oil is in a liquid form for contacting with the liquid organic amine. Suitably, the contacting step is carried out at a pressure of from 0.1 MPa absolute to 10 MPa absolute (1 bar absolute to 100 bar absolute).

The contacting of glyceride oil comprising chloropropanol and/or glycidol, or their fatty acid esters, organic amine and preferably water typically comprises stirring the glyceride oil, organic amine and water if present for a suitable period of time. Typically, the stirring is carried out for a time period of from 1 minute to one hour, and preferably from 5 minute to 30 minutes.

The contacting is preferably carried out in a mixer such as a shear mixer. Alternatively, the contacting is carried out with an ultrasonic stirrer, an electromagnetic stirrer, or by bubbling inert gas through the mixture. Preferably, the mixture of organic amine, glyceride oil and preferably water is stirred at a speed of from 500 to 5000 rpm, preferably 3500 to 4500 rpm such as 4000 ppm.

Typically, after the step of contacting and stirring the glyceride oil, organic amine and water if present, the mixture is left so that an oil phase separates from a non-organic phase. The non-organic phase comprises the organic amine and preferably water. The oil phase comprises a treated glyceride oil with a reduced concentration of chloropropanol and/or glycidol, or their fatty acid esters compared to the glyceride oil prior to treatment. Typically, the mixture is left for several hours to allow the two phases to separate and preferably the mixture is left over night.

Any suitable means of separating the treated glyceride oil phase and the non-organic phase may be used. For example, gravity separation (for example, in a settling unit) may be carried out. In this process, the treated glyceride oil is generally the upper phase and the organic amine and water if present form the lower phase. Separation may also be achieved using for example, a decanter, a hydrocyclone, electrostatic coalesce, a centrifuge or a membrane filter press. Contacting and separation steps may be repeated several times, for example 2 to 4 times. Preferably, separation is carried out via centrifugation.

Contacting and separation steps may also be carried out together in a counter-current reaction column. The glyceride oil (hereinafter "oil feed stream") is generally introduced at or near the bottom of the counter-current reaction column and the organic amine (hereinafter "organic amine feed stream") at or near the top of the counter-current reaction column. A treated oil phase (hereinafter "product oil stream") is withdrawn from the top of the column and a phase containing an organic amine and solvent when present (hereinafter "secondary stream") from at or near the bottom thereof. Preferably, the counter-current reaction column has a sump region for collecting the secondary stream. Preferably, the oil feed stream is introduced to the counter-current reaction column immediately above the sump region. More than one counter-current reaction column may be employed, for example 2 to 6, preferably 2 to 3 columns arranged in series. Preferably, the counter-current reaction column is packed with a structured packing material, for example, glass Raschig rings, thereby increasing the flow path for the oil and organic amine through the column. Alternatively, the counter-current reaction column may contain a plurality of trays.

In some instances, contacting and separating steps are carried out together in a centrifugal contact separator, for example, a centrifugal contact separator as described in U.S. Pat. Nos. 4,959,158, 5,571,070, 5,591,340, 5,762,800, WO 99/12650, and WO 00/29120. Suitable centrifugal contact separators include those supplied by Costner Industries Nevada, Inc. Glyceride oil and the organic amine may be introduced into an annular mixing zone of the centrifugal contact separator. Preferably, the glyceride oil and the organic amine are introduced as separate feed streams into the annular mixing zone. The glyceride oil and the organic amine are rapidly mixed in the annular mixing zone. The resulting mixture is then passed to a separation zone wherein a centrifugal force is applied to the mixture to produce a clean separation of an oil phase and a secondary phase.

Preferably, a plurality of centrifugal contact separators are used in series, preferably, 2 to 6, for example 2 to 3. Preferably, the oil feed stream is introduced into the first centrifugal contact separator in the series while the organic amine feed stream is introduced into the last centrifugal contact separator in the series such that oil of progressively decreasing content of, for instance, free fatty acid (FFA), chloropropanol and/or glycidol, or their fatty acid esters is passed from the first through to the last centrifugal contact separator in the series while an organic amine stream of progressively increasing content of, for instance, FFA, chloropropanol and/or glycidol, or their fatty acid esters content is passed from the last through to the first centrifugal contact separator in the series. Thus, a phase containing an organic amine, chloropropanol and/or glycidol, or their fatty acid esters and FFA is removed from the first centrifugal contact separator and the treated oil phase is removed from the last centrifugal contact separator in the series.

The treated glyceride oil may also be passed through a coalescer filter for coalescing fine droplets of non-oil phase liquid, so as to produce a continuous phase and facilitate phase separation. Preferably, where the organic amine used for contact is used in combination with a solvent, the coalescer filter is wetted with the same solvent to improve filtration.

After the organic amine, glyceride oil and preferably water have been contacted and separated, a treated glyceride oil is separated from a non-organic phase. The treated glyceride oil has a lower concentration of chloropropanol and/or glycidol, or their fatty acid esters than before it was contacted with the organic amine. Typically, the treated glyceride oil has a concentration of chloropropanol and/or glycidol, or their fatty acid esters which is less than 90% of the glyceride oil before treatment. For example, the treated glyceride oil may have a content of chloropropanol and/or glycidol, or their fatty acid esters which is less than 80%, 70%, 60%, 50%, 40%, 30%, 20%, or 10% of the concentration of the glyceride oil before treatment. Preferably, the treated glyceride oil has a concentration of less than 10% and most preferably less than 5% of the glyceride oil before treatment.

In some instances, the treated glyceride oil has a concentration of chloropropanols, such as 3-MCPD, that is less than 10% than that of the glyceride oil before treatment. In some instances, the treated glyceride oil has a concentration of chloropropanol esters, such as monochloropropanol esters (MCPDE) that is from 50% to 80% of the total concentration of chloropropanol esters in the glyceride oil before treatment.

The treated glyceride oil may be further treated so as to remove residual organic amine that may be present in the treated glyceride oil. For example, the treated glyceride oil may be washed with a small quantity of water (for example 100 ml) so as to reduce the concentration of any residual organic amine present in the treated glyceride oil.

The treated glyceride oil may then be dried to further reduce the concentration of residual organic amine present in the treated glyceride oil. For example, organic amine may be removed from the treated glyceride oil by vacuum drying. Alternatively, organic amine may be removed from the treated glyceride oil by vacuum distillation.

Use according to the invention may comprise contacting organic amine and any type of glyceride oil. The glyceride oil may comprise an animal oil or a vegetable oil. Preferably, the oil comprises a vegetable oil.

The term "glyceride oil" used herein refers to an oil or fat which comprises triglycerides as the major component thereof. For example, the triglyceride component may be at least 50 wt. % of the glyceride oil. The glyceride oil may also include mono- and/or di-glycerides. Preferably, the glyceride oil is at least partially obtained from a natural source (for example, a plant, animal or fish/crustacean source) and is also preferably edible. Glyceride oils include vegetable oils, marine oils and animal oils/fats which typically also include phospholipid components in their crude form. Typically, the glyceride oil comprises a vegetable oil or animal oil that is liquid at room temperature. However, the glyceride oil may comprise a vegetable oil or animal oil that is solid at room temperature. In this scenario, the contacting of the glyceride oil with the organic amine may be done at a temperature above room temperature and above the melting point of the glyceride oil.

Vegetable oils include all plant, nut and seed oils. Examples of suitable vegetable oils which may be of use in the present invention include: açai oil, almond oil, beech oil, cashew oil, coconut oil, colza oil, corn oil, cottonseed oil, grapefruit seed oil, grape seed oil, groundnut oil, hazelnut oil, hemp oil, lemon oil, macadamia oil, mustard oil, olive oil, orange oil, palm oil, palm kernel oil, peanut oil, pecan oil, pine nut oil, pistachio oil, poppyseed oil, rapeseed oil, rice bran oil, safflower oil, sesame oil, soybean oil, sunflower oil, walnut oil and wheat germ oil.

Suitable marine oils include oils derived from the tissues of oily fish or crustaceans (e.g. hill). Examples of suitable animal oils/fats include pig fat (lard), duck fat, goose fat, tallow oil, and butter.

Preferably, the glyceride oil comprises vegetable oil. Preferred vegetable oils include coconut oil, corn oil, cottonseed oil, groundnut oil, olive oil, palm oil, rapeseed oil, rice bran oil, safflower oil, soybean oil, sunflower oil, or mixtures thereof.

The term "soybean oil" used herein includes oil extracted from the seeds of the soybean (*Glycine max*). The term "rapeseed oil" used herein is synonymous with canola oil and refers to the oil derived from a species of rape plant, for example rapeseed (*Brassica napus* L.) or field mustard/turnip rape (*Brassica rapa* subsp. *oleifera*, syn. *B. campestris* L.). The term "palm oil" used herein includes an oil at least partially derived from a tree of genus *Elaeis*, forming part of the Arecaceae genera, and including the species *Elaeis guineensis* (African oil palm) and *Elaeis oleifera* (American oil palm), or hybrids thereof. Reference to palm oil herein therefore also includes palm kernel oil, as well as fractionated palm oil, for example palm oil stearin or palm oil olein fractions.

In instances of the present disclosure, the glyceride oil comprises a cooking oil, such as a vegetable cooking oil. In some instances, the glyceride oil comprises a used oil. In some instances, the glyceride oil comprises a used vegetable oil, and preferably a used vegetable cooking oil.

Use according to the invention may also comprise reducing the free fatty acid (FFA) content of the glyceride oil. Glyceride oils often comprise free fatty acid molecules which it is desirable to remove from the glyceride oil during its refinement. FFA which may be present in the glyceride oils include monounsaturated, polyunsaturated and saturated FFA. Examples of unsaturated FFA include: myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid and docosahexaenoic acid. Examples of saturated FFA include: caprylic acid, capric acid, undecylic acid, lauric acid, tridecylic acid, myristic acid, palmitic acid, margaric acid, stearic acid, nonadecylic acid, arachidic acid, heneicosylic acid, behenic acid, lignoceric acid and cerotic acid.

In instances of the invention, the free fatty acids are present in the glyceride oil in an amount of from 1 wt. % to 50 wt. %, preferably 1 wt. % to 30 wt. %, more preferably 1 wt. % to 25 wt. %, and most preferably 1 wt. % to 20 wt. %, such as from 1 wt. % to 10 wt. %.

After treatment with organic amine in accordance with use according to the invention, the free fatty acid content of the glyceride oil is typically reduced to from 0.1 wt. % to 10 wt. %, preferably, 0.1 wt. % to 5 wt. %, more preferably 0.1 wt. % to 1 wt. %, and most preferably 0.25 wt. % to 1 wt. %.

Fatty acid content in the glyceride oil may be determined using standard test procedures in the art such as ASTM D5555.

Use according to the invention may comprise subjecting the treated glyceride oil to further treatment. Further treatment is typically done to the treated glyceride oil as part of a typical glyceride oil refinement process.

The skilled person is aware of the different refining steps typically used in edible oil processing, including for example refining steps discussed in: "Practical Guide to Vegetable *Oil Processing",* 2008, Monoj K. Gupta, AOCS Press, as well as in the Edible Oil Processing section of the "AOCS Lipid Library" web site (lipidlibrary.aocs.org).

The further treatment may comprise one or more steps selected from degumming, bleaching, winterisation, depigmentation, and deoderisation. Preferably, the further treatment comprises deoderisation and/or bleaching.

In some instances, the at least one further treating step comprises the steps of degumming, bleaching and deodorization. Alternatively, in other instances, the at least one further treating step comprises a deodorisation step and the process does not comprise a step of degumming and/or bleaching. Therefore, in exemplary instances, the at least one further treating step comprises the steps of degumming and deodorization, but no bleaching. In other exemplary instances, the at least one further refining step comprises the steps of bleaching and deodorization, but no degumming step.

An additional advantage of the treatment with organic amine in accordance with the present invention is that the treatment has also been found to at least partially remove pigments and odiferous compounds which are typically removed in a high temperature (for example, 240° C. to 270° C.) deodorization step during conventional refining processes. Treatment of glyceride oil with the organic amine means that lower temperatures and/or time periods can be used for the deodorization step as part of the overall refining process. This has the advantage of reducing the energy requirements of the refining process.

Degumming typically involves contacting the oil with aqueous phosphoric acid and/or aqueous citric acid to remove both hydratable and non-hydratable phosphatides (NHP). Typically, citric acid or phosphoric acid is added as a 50 wt % aqueous solution. Suitably, the aqueous acid is used in an amount of about 0.02% to about 0.20% of acid by weight of oil, preferably 0.05% to about 0.10% of acid by weight of oil. Suitably, the degumming step is carried out at a temperature of from about 50 to 110° C., preferably 80° C. to 100° C., for example 90° C. The degumming step may suitably last from 5 minutes to 60 minutes, preferably 15 to 45 minutes, more preferably, 20 to 40 minutes, for example 30 minutes. After settling of the mucilage following the acid treatment, the aqueous phase is separated before the degummed oil is typically dried. Drying of the degummed oil suitably takes place at a temperature of from 80 to 110° C. for a suitable time period, for example 20 to 40 min, at reduced pressure, for instance, at 2 to 3 kPa (20 to 30 mbar).

As the skilled person is aware, for glyceride oils with low phosphatide content (for example, less than 20 ppm by weight of phosphorus), a dry degumming process may be used in which the phosphoric acid or citric acid is added without significant dilution with water (for example, an 85% acid solution). NHP are converted into phosphatidic acid and a calcium or magnesium bi-phosphate salt which can be removed from the oil in a subsequent bleaching step. For oils rich in phosphatides, particularly NHP, dry degumming is known to be less well suited since excessive amounts of bleaching earth are required.

Bleaching is incorporated into an edible oil refining process to reduce colour bodies, including chlorophyll, residual soap and gums, trace metals and oxidation products. Bleaching typically involves contacting the oil with an amount of bleaching clay or earth, for example from 0.5 to 5 wt. % clay based on the mass of the oil. Bleaching clays or earths are typically composed of one or more of three types of clay minerals: calcium montmorillonite, attapulgite, and sepiolite. Any suitable bleaching clay or earth may be used in accordance with the present invention, including neutral and acid activated clays (e.g. bentonite). The oil is suitably contacted with bleaching clay for 15 to 45 minutes, preferably 20 to 40 minutes before the earth is separated, typically be filtration. The oil is typically contacted with bleaching clay or earth at a temperature of from 80° C. to 125° C., preferably at a temperature of from 90° C. to 110° C. Following an initial period of contact ("wet bleaching") conducted under atmospheric pressure, a second stage of the bleaching process is conducted under reduced pressure ("dry bleaching"), for example at 2 to 3 kPa (20 to 30 mbar).

Conventional glyceride oil refining processes typically include a FFA neutralisation step with a strong base, for example sodium hydroxide or potassium hydroxide (corresponding to a so called "chemical refining" process). Alternatively, deacidification can be achieved by adjusting the deodorisation parameters accordingly to ensure that volatile FFA is removed in that step (a so called "physical refining" process). A disadvantage of a FFA neutralisation step ("chemical refining") is that it is accompanied by unwanted saponification, lowering triglyeride content, whilst soap formation can lead to substantial neutral oil losses as a result of emulsification. The organic amine treatment forming part of the use of the present invention is effective at neutralising FFA in the oil and may entirely replace a conventional neutralisation step used in a chemical refining process. Advantageously, treatment with the organic amine has the benefit that it does not lead to saponification of neutral oil. Thus, in preferred instances of the present invention, the refining process does not include a neutralisation step with an inorganic base (e.g. sodium hydroxide).

FFA present in the oil may be neutralised upon contact with the organic amine to form a salt. In preferred instances, the amount of organic amine employed in the contacting step is at least stoichiometric with the molar amount of FFA contained in the oil. For example, the molar ratio of the organic amine to FFA in the oil may be from 1:1 to 10:1, or from 1.5:1 to 5:1. The content of FFA in the glyceride oil may be determined prior to treatment with organic amine using common titration techniques, of which the person of skill in the art is aware. For instance, titration with sodium hydroxide using phenolphthalein indicator may be used to determine the FFA content of glyceride oil.

As the skilled person is aware, deodorization corresponds to a stripping process in which an amount of stripping agent is passed through an oil in a distillation apparatus, typically by means of direct injection, at reduced pressure for a period of time so as to vaporize and extract volatile components, such as FFA, aldehydes, ketones, alcohols, hydrocarbons, tocopherols, sterols, and phytosterols. The stripping agent is preferably steam, although other agents such as nitrogen may be used. The amount of stripping agent suitably used is from about 0.5% to about 5% by weight of oil.

The temperature range of deodorization for the refining process according to the present invention is suitably from 160° C. to 270° C. Where reference is made herein to the temperature of the deodorization step, this refers to the temperature the oil is heated to before being exposed to the stripping agent. The pressure range of deodorization is suitably from 0.1 to 0.4 kPa (1 to 4 mbar), preferably 0.2-0.3 kPa (2 to 3 mbar). Suitable time periods for deodorization are typically from 30 to 180 minutes, for example 60 to 120 minutes, or 60 to 90 minutes.

The skilled person is able to determine a suitable length of deodorization by analysing the appearance and composition of the glyceride oil. For instance, determining the p-anisidine value (AnV) of the oil. The p-anisidine value of an oil is a measure of its oxidative state and, more specifically, provides information regarding the level of secondary oxidation products contained in an oil, although primarily aldehydes such as 2-alkenals and 2,4-dienals. The p-anisidine value (AnV) therefore also gives an indication of the level of oxidation products which are intended to be removed by means of the deodorization step. For instance, satisfactory deodorization may be achieved where, for example, the AnV is less than 10, preferably less than 5, as determined by AOCS Official Method Cd 18-90.

In addition or alternatively, the amount of aldehyde and ketone components of the oil can be determined, which are typically associated with a crude oil's odour, to determine whether sufficient deodorization has taken place. Typical volatile odiferous aldehyde and ketone components of crude or rancid palm oil include: acetaldehyde, benzaldehyde, n-propanal, n-butanal, n-pentanal, n-hexanal, n-octanal, n-nonanal, 2-butenal, 3-methylbutanal, 2-methylbutanal, 2-pentenal, 2-hexenal, 2E,4E-decadienal, 2E,4Z-decadienal, 2-butanone, 2-pentanone, 4-methyl-2-pentanone, 2-heptanone, 2-nonanone. Preferably, each of these components is individually present in a deodorized oil in an amount less than 3 mg/kg of oil, more preferably less than 1 mg/kg of oil, most preferably less than 0.5 mg/kg of oil.

The amount of aldehydes and ketones may be readily determined by chromatographic methods, for instance GC-TOFMS or GCxGC-TOFMS. Alternatively, derivatization of aldehydes and ketones may be used to improve chromatographic analysis. For example, it is known that aldehydes and ketones may be derivatized with 2,4-dinitrophenylhydrazine (DNPH) under acidic conditions. This reagent does not react with carboxylic acids or esters and therefore the analysis is not affected by the presence of such components in a glyceride oil sample. Following derivatization, HPLC-UV analysis can quantify the total amount of aldehydes and ketones which are present in a sample.

Conventional deodorisation temperatures are typically in excess of 220° C., for example 240° C. to 270° C., and typically operated for 60 to 90 minutes. Where lower than conventional temperatures are used for deodorisation as allowed by the process of the present invention, for example 160° C. to 200° C., the time periods for deodorization may be lengthened to ensure sufficient deodorization, yet still involve less energy consumption than a conventional deodorization operated at higher temperature, for example 240° C. to 270° C., for a shorter period.

In preferred instances, the same or lower than conventional deodorization time periods are used in combination with the lower than conventional deodorization temperature, yet achieve the same extent of deodorization as a result of the preceding organic amine treatment. In other preferred instances, where conventional temperatures are used for the deodorization step included in the refining process of the invention, for example 240° C. to 270° C., the time period for the deodorization may be reduced compared to that which is conventionally used and still achieve a comparable level of deodorization as a result of the preceding organic amine treatment.

In particularly preferred instances, where the at least one further refining step according to use of the present invention comprises deodorisation, the temperature of the deodorization is from 160° C. to 200° C., more preferably 170° C. to 190° C. Preferably, the time periods over which deodorization is conducted at these temperatures is from 30 to 150 minutes, more preferably 45 to 120 minutes, most preferably 60 to 90 minutes.

The organic amine treatment according to the use of the present invention may suitably be applied to crude glyceride oil which has not undergone any previous refining steps following oil extraction. Alternatively, use of the present invention may be applied to glyceride oil which has undergone at least one additional refining step prior to treatment organic amine. Typically, the at least one additional refining step is selected from bleaching and/or degumming.

As discussed hereinabove, conventional glyceride oil refining processes include a high temperature (for example 240 to 270° C.) deodorization step which provides a significant amount of heat energy which contributes substantially to the formation of chloropropanol fatty acid esters and glycidyl fatty acid esters, when the oil comprises a source of chloride and/or depending on the proton activity of the oil. As a result, in some instances, where the at least one refining step comprises deodorization, this may be undertaken before the organic amine treatment. This ensures that organic amine treatment is applied to a deodorized glyceride oil wherein the concentration of chloropropanol fatty acid esters and glycidol fatty acid esters is likely to be at its highest.

It has been found that the absence or presence of FFA in the oil does not affect the capacity of the organic amine treatment for removing chloropropanol and glycidol, and their fatty acid esters, from glyceride oil. Thus, whether or not the organic amine is involved in neutralisation of FFA or not, removal of chloropropanol and glycidol, and their fatty acid esters, is not significantly impacted. Thus, the basic ionic liquid treatment may be applied to oils that have undergone various degrees of deodorization leading to increased levels of fatty acid esters of chloropropanol and glycidol, yet may or may not have substantially removed FFA.

Preferably, the organic amine treatment of the present invention is used to remove chloropropanol, or fatty acid esters thereof, and/or glycidyl fatty acid esters from glyceride oil. More preferably, the organic amine treatment of the present invention is used to remove monochloropropanol, or fatty acid esters thereof, from glyceride oil. Even more preferably, the organic amine treatment of the present invention is used to remove unbound monochloropropanol from glyceride oil. Most preferably, the organic amine treatment of the present invention is used to remove unbound 3-MCPD from glyceride oil.

The organic amine treatment used in accordance with the present invention is intended to obviate the use of ion exchange resins and ultrafiltration membranes and the like for removing contaminants which can contribute significantly to the materials costs associated with glyceride oil refining. Thus, in preferred instances, the refining process described herein does not comprise treatment of the glyceride oil with ion exchange resins or ultrafiltration membranes.

According to another aspect of the invention, there is provided a process for removing chloropropanol and/or glycidol, or their fatty acid esters, from glyceride oil, wherein the total concentration of chloropropanol and fatty acid esters thereof in the glyceride oil is at least 0.01 ppm, and wherein the total concentration of glycidyl fatty acid esters in the glyceride oil is at least 0.1 ppm, the process comprising the steps of:

(i) contacting glyceride oil comprising chloropropanol and/or glycidol, or their fatty acid esters, with an organic amine and water to form a treated glyceride oil and an aqueous phase; wherein the water is added in an amount from 5% v/v to 40% v/v relative to the organic amine and the amount of organic amine is from 1 wt. % to 75 wt. % relative to the glyceride oil; and the organic amine is selected from:

$$N(R^a)(R^b)(R^c),$$

wherein: $R^a$, $R^b$, and $R^c$ are each independently selected from a $C_1$ to $C_8$, straight chain or branched alkyl group or a $C_3$ to $C_6$ cycloalkyl group; or any two of $R^a$, $R^b$ and $R^c$ combine to form an alkylene chain $—(CH_2)_q—$ wherein q is from 3 to 6; and wherein said alkyl or cycloalkyl groups may optionally be substituted by one to three groups selected from: $C_1$ to $C_4$ alkoxy, $C_2$ to $C_8$ alkoxyalkoxy, $C_3$ to $C_6$ cycloalkyl, —OH, $—NH_2$, —SH, $—CO_2(C_1$ to $C_6)$alkyl, and $—OC(O)(C_1$ to $C_6)$alkyl; or $R^a$ is hydrogen and $R^b$, and $R^c$ are as previously defined; and (ii) separating the treated glyceride oil from the aqueous phase after contacting the glyceride oil with the organic amine and water; wherein the treated glyceride oil has a reduced concentration of chloropropanol and/or glycidol, or their fatty acid esters, compared to the glyceride oil contacted in step (i).

In some instances, the process of the invention is a pre-treatment process. The term "pre-treatment process" as used herein is used to refer to a treatment carried out to the glyceride oil before any other refining step (such as the steps discussed above). Thus, in instances, the pre-treatment process is carried out directly after extraction of the glyceride oil and prior to any other step of processing the glyceride oil.

Alternatively, in instances where the glyceride oil comprises a used oil, the term "pre-treatment process" refers to where the pre-treatment process is carried out prior to any other processing step of the used oil, and after collection of the used oil.

Any of the features and preferred features discussed above in relation to the first aspect of the invention equally apply to this aspect of the invention. In particular, all features of the organic amine, glyceride oil, chloropropanol, glycidol, and fatty acid esters thereof, contacting and separation steps, and further treatments discussed above in relation to the first aspect of the invention apply equally to the process according to the second aspect of the invention.

Use according to the first aspect of the invention, and processes according to the second aspect of the invention may further comprise the step of regenerating the organic amine from the aqueous phase. Preferably, the step of regenerating the organic amine from the aqueous phase comprises vacuum distillation.

Instances of the invention described hereinbefore may be combined with any other compatible instances to form further instances of the invention.

The present invention will now be illustrated by way of the following examples.

EXAMPLES

Crude palm oil (CPO) (130 g, 5.25%, 0.0269 mol FFA) was heated to 50° C. The liquid was stirred with a high shear mixer at 4000 rpm. Aqueous dimethylethanolamine (70% v/v) (DMEA) (2.519 g, 0.0282 mol) was added. The solution was stirred for 15 minutes before centrifugation. An oil phase was separated from a non-organic phase.

FFA levels in the separated oil phase were determined by colorimetric titration. Typically, 1 g of oil was dissolved in 25 ml isopropyl alcohol (IPA), before a few drops of phenolphthalein were added and the solution was titrated against 0.1M potassium hydroxide solution. The initial FFA value of 5.25% in the crude palm oil was reduced to 0.3% after treatment with DMEA.

The monochloropropanediol ester (MCPDE) levels before and after treatment are shown in the table below as example 6.

The above procedure was repeated for a variety of different oils with different initial 3-monochloropropanol and monochloropropanediol ester amounts, and also different FFA amounts. The levels of 3-MCPD and MCPDE before and after treatment are shown in the table below as examples 1 to 5. The oils were doped with 3-MCPD and MCPDE before treatment.

| | OIL | Crude oil 3-MCPD | Crude oil MCPDE | Treated oil 3-MCPD | Treated oil MCPDE |
|---|---|---|---|---|---|
| Example 1 | Canola | 203 ppm | — | <1 ppm | — |
| Example 2 | Canola | — | 49 ppm | — | 33 ppm |
| Example 3 | Canola | 193 ppm | | <1 ppm | |
| Example 4 | Canola (5% FFA) | — | 47 ppm | | 32 ppm |
| Example 5 | Olive | — | 40 ppm | — | 30 ppm |
| Example 6 | Palm (5.25% FFA) | | 25 ppm | — | 17 ppm |

The data in the above table shows that organic amine treatment in accordance with the invention lowers the content of both 3-MCPD and MCPDE in the oils. It was found that the organic amine treatment is far better at removing 3-MCPD from the oil than MCPDE. 3-MCPD levels were reduced to below 1 ppm. Typically, around 33% of MCPDE was removed from the oils by the organic amine treatment.

The invention claimed is:

1. A process for removing chloropropanol, or its fatty acid esters, from glyceride oil, wherein the total concentration of chloropropanol and fatty acid esters thereof in the glyceride oil is at least 0.01 ppm, the process comprising the steps of:

(i) contacting glyceride oil comprising chloropropanol, or its fatty acid esters, with an organic amine and water to form a treated glyceride oil and an aqueous phase; wherein the water is added in an amount from 5% v/v to 40% v/v relative to the organic amine and the amount of organic amine is from 1 wt. % to 75 wt. % relative to the glyceride oil; and the organic amine is dimethylethanolamine:

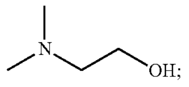

and (ii) separating the treated glyceride oil from the aqueous phase after contacting the glyceride oil with the organic amine and water; wherein the treated glyceride oil has a reduced concentration of chloropropanol, or its fatty acid esters, compared to the glyceride oil contacted in step (i).

2. The process according to claim 1, wherein the water is added in an amount from 15% v/v to 40% v/v relative to the organic amine.

3. The process according to claim 1, wherein the amount of organic amine used is from 1 wt. % to 40 wt. % relative to the glyceride oil.

4. The process according to claim 1, wherein the organic amine is contacted with the glyceride oil at a temperature of less than 80° C.

5. The process according to claim 1, wherein contacting the glyceride oil with the organic amine comprises stirring a mixture of the organic amine and glyceride oil.

6. The process according to claim 1, wherein the total concentration of chloropropanol and fatty acid esters thereof in the glyceride oil which is contacted with the organic amine is at least 0.1 ppm, at least 0.5 ppm or at least 1.0 ppm.

7. The process according to claim 1, wherein the chloropropanol is monochloropropanol, or fatty acid esters thereof.

8. The process according to claim 1, wherein the total concentration of chloropropanol and fatty acid esters thereof in the glyceride oil is from 20 ppm to 250 ppm.

9. The process according to claim 1, wherein treated glyceride oil is separated from a non-organic phase following the contacting step.

10. The process according to claim 1, wherein the glyceride oil is a vegetable oil.

11. The process according to claim 1, wherein residual organic amine is removed from the treated glyceride oil.

12. The process according to claim 11, wherein residual organic amine is removed from the treated glyceride oil at least in part by vacuum distillation, wherein the vacuum distillation is conducted at a temperature of from 25 to 70° C.

13. The process according to claim 1, wherein the glyceride oil comprises a used oil, such as a used vegetable cooking oil.

14. The process according to claim 1, wherein the treated glyceride oil undergoes further treatment.

15. The process according to claim 14, wherein the further treatment comprises one or more steps selected from degumming, bleaching, winterization, depigmentation and deodorization.

16. The process according to claim 1, further comprising the step of regenerating DMEA from the aqueous phase.

17. The process according to claim 1, wherein the treated glyceride oil which is separated has a total concentration of monochloropropanol and fatty acid esters thereof which is less than 75 wt. % than that of the glyceride oil which is contacted with the organic amine.

18. The process according to claim 1, wherein the amount of organic amine used is from 2 wt. % to 8 wt. %.

19. The process according to claim 1, wherein the glyceride oil comprises a used cooking oil.

20. The process according to claim 10, wherein the vegetable oil is selected from coconut oil, corn oil, cottonseed oil, groundnut oil, olive oil, palm oil, rapeseed oil, rice bran oil, safflower oil, soybean oil and sunflower oil.

* * * * *